US012737716B2

(12) United States Patent
Ghosh et al.

(10) Patent No.: US 12,737,716 B2
(45) Date of Patent: Sep. 15, 2026

(54) METHOD AND SYSTEM FOR PACKAGE MOVEMENT VISIBILITY IN WAREHOUSE OPERATIONS

(71) Applicant: Hopstack Inc., Texas, CA (US)

(72) Inventors: Megha Ghosh, Austin, TX (US); Roshan Rajendra Maind, Austin, TX (US); Shantanu Patel, Santa Clara, CA (US); Giridhar Sampathkumar, Chennai (IN); Vivek Singh, Bangalore (IN); Gaurav Saraf, 110 Squires Drive, CA (US); Vicky Danny Rudy Jeannine Froyen, Kessel-Lo (BE); Siddharth Agarwal, Ahmedabad (IN)

(73) Assignee: HOPSTACK INC., Austin, TX (US)

( * ) Notice: Subject to any disclaimer, the term of this patent is extended or adjusted under 35 U.S.C. 154(b) by 1002 days.

(21) Appl. No.: 17/822,196

(22) Filed: Aug. 25, 2022

(65) Prior Publication Data

US 2023/0060506 A1 Mar. 2, 2023

Related U.S. Application Data

(60) Provisional application No. 63/236,922, filed on Aug. 25, 2021.

(51) Int. Cl.

| | |
|---|---|
| ***G06Q 10/0833*** | (2023.01) |
| ***G06V 10/74*** | (2022.01) |
| ***G06V 10/764*** | (2022.01) |
| ***G06V 10/82*** | (2022.01) |
| ***G06V 10/94*** | (2022.01) |

(Continued)

(52) U.S. Cl.
CPC ......... *G06Q 10/0833* (2013.01); *G06V 10/74* (2022.01); *G06V 10/764* (2022.01); *G06V 10/82* (2022.01); *G06V 10/95* (2022.01); *G06V 20/50* (2022.01); *G06V 20/63* (2022.01); *G06V 30/19* (2022.01)

(58) Field of Classification Search
CPC .. G06Q 10/0833; G06V 10/74; G06V 10/764; G06V 10/82; G06V 10/95; G06V 20/50; G06V 20/63; G06V 30/19; G06V 30/424
See application file for complete search history.

(56) References Cited

U.S. PATENT DOCUMENTS 9,488,986 B1 * 11/2016 Solanki .................. G06V 20/56
10,148,918 B1 * 12/2018 Seiger ................ G06Q 10/0833
(Continued)

*Primary Examiner* — Michael Collins

(57) ABSTRACT

Present disclosure provides a method and system for package movement visibility in warehouse operations. The method includes identifying, by the package management system (1000), an object entering AOE and moving in a predetermined direction and recording, by the package management system (1000), image frame of the object. The method also includes determining, by the package management system (1000), that the object in the image frame is a package and determining, by the package management system (1000), a label on the package from the image frame. Further, the method also includes determining, by the package management system (1000), a match to the label in a cloud platform (400) and sending, by the package management system (1000), tracking details associated with the package based on the match to the label in the cloud platform (400), to a client device in real-time.

20 Claims, 7 Drawing Sheets

(51) Int. Cl.

| | |
|---|---|
| ***G06V 20/50*** | (2022.01) |
| ***G06V 20/62*** | (2022.01) |
| ***G06V 30/19*** | (2022.01) |

(56) References Cited

U.S. PATENT DOCUMENTS

| | | | | |
|---|---|---|---|---|
| 11,163,968 | B1 * | 11/2021 | Boguszewski | G06K 7/1447 |
| 12,249,082 | B2 * | 3/2025 | Ryan | G06F 18/22 |
| 2022/0036276 | A1 * | 2/2022 | Cella | G06Q 10/06313 |
| 2022/0391796 | A1 * | 12/2022 | O'Herlihy | G06V 20/48 |
| 2023/0099352 | A1 * | 3/2023 | Cantwell, Jr. | G06T 7/536<br>382/154 |
| 2024/0265342 | A1 * | 8/2024 | Prasad | G06V 20/44 |

* cited by examiner

FIG. 3A

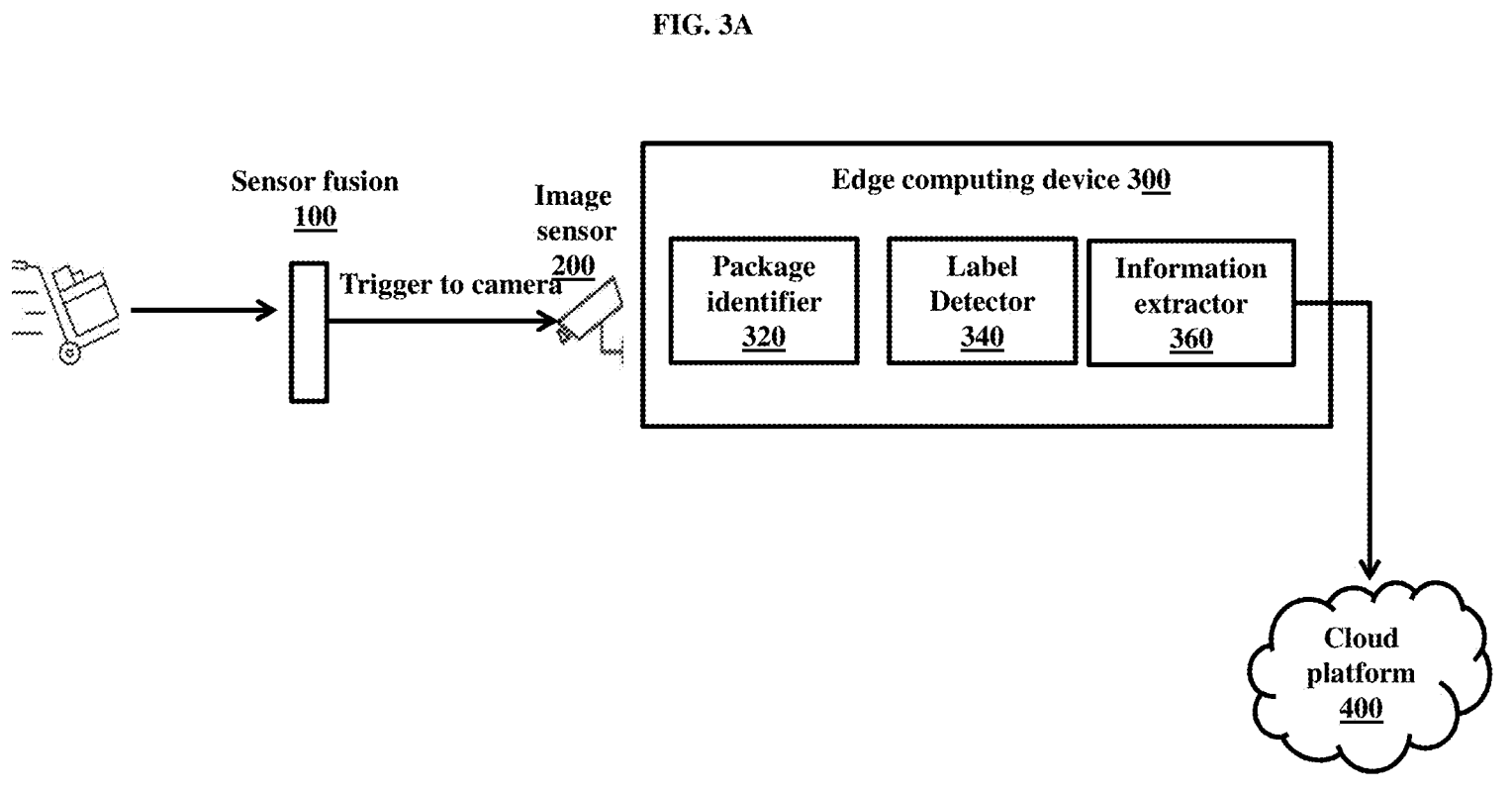

Sensor fusion 100

Trigger to camera

Image sensor 200

Edge computing device 300

Package identifier 320

Label Detector 340

Information extractor 360

Cloud platform 400

502
Tracking proximity of the approaching object
504
Determine if object is in AOE and right direction of movement?
No
Yes
506
Trigger camera to capture images of the object
508
Determine if object is in pallet?
No
Yes
510
Determine if label present on pallet from images captured?
No
Yes
512
Determine if label includes information ?
No
Yes
Cloud platform
516
A
B
514

METHOD AND SYSTEM FOR PACKAGE MOVEMENT VISIBILITY IN WAREHOUSE OPERATIONS

TECHNICAL FIELD

The embodiments herein generally relate to tracking systems. More particularly embodiments herein relate to a method and system for package movement visibility in warehouse operations.

BACKGROUND

Generally, a large number of packages are shipped in and out of warehouses on a daily basis. Manufacturing facilities or goods producing companies are held accountable for on-time delivery of the packages to customers or clients. Such companies are often in contract with third-party shipment carriers who pick up outgoing packages from manufacturer's warehouses and incoming packages to the manufacturer's warehouses and transport the packages to end customers on behalf of the manufacturer. However, it is extremely difficult for manufacturers to keep track of pickup time for every package if they are dealing with multiple shipping docks/doors, carriers and warehouses.

There are also shipments such as for example less-than-truckload (LTL) shipments where different types of shipments are loaded onto a same truck in order to maximize capacity of the truck. In such scenarios, the tracking of individual shipments becomes extremely difficult as the individual shipments are assembled into a package. While there is a correlation between the shipments in the package, information of the package going out of the warehouse is important to know which shipments were shipped. Many warehouses involve significant manual labor to keep track of the shipments by scanning barcodes associated with every outbound package/shipment, resulting in significant cost to the manufacturer. Thus, it is desired to address the aforementioned disadvantages or other shortcomings or at least provide a useful alternative.

SUMMARY

The present disclosure provides a method for package movement visibility in warehouse operations by a package management system. The method includes identifying, by the package management system, at least one object entering an area of effect (AOE) and a moving in a predetermined direction and recording, by the package management system, at least one image frame of the at least one object. The method also includes determining, by the package management system, that the at least one object in the at least one image frame is at least one package and determining, by the package management system, at least one label on the at least one package from the at least one image frame. The method determining, by the package management system, a match to the at least one label in a cloud platform; and sending, by the package management system, tracking details associated with the at least one package based on the match to the at least one label in the cloud platform, to a client device in real-time.

In an embodiment, identifying, by the package management system, the at least one object entering the AOE and moving in the predetermined direction includes determining, by the package management system, the at least one object approaching the package management system and determining, by the package management system, a proximity of the at least one object approaching the package management system. The method also includes determining, by the package management system, that the proximity of the at least one object approaching the package management system meets a proximity threshold and identifying, by the package management system, the at least one object is in the AOE and moving in the predetermined direction based on the proximity threshold.

In an embodiment, determining, by the package management system, that the at least one object in the at least one image frame is at least one package includes processing, by the package management system, the at least one image frame using a KNN classifier; and determining, by the package management system, that the at least one object in the captured at least one image frame is the at least one package.

In an embodiment, the method further includes determining, by the package management system, that the at least one object in the captured at least one image frame is not the at least one package; and stopping, by the package management system, the recording of the at least one image frame of the at least one object.

In an embodiment, determining, by the package management system, the match to the at least one label in the cloud platform includes determining, by the package management system, whether the at least one label on the at least one package comprises information associated with the at least one package and extracting, by the package management system, the information associated with the at least one package from the at least one label, in response to determining that the at least one label on the at least one package comprises the information associated with the at least one package. The method also includes sending, by the package management system, the extracted information associated with the at least one package from the at least one label to the cloud platform; and determining, by the package management system, the match to the extracted information associated with the at least one package in the cloud platform.

In an embodiment, the method further includes determining, by the package management system, that the at least one label on the at least one package does not comprise the information associated with the at least one package and storing, by the package management system, the at least one image frame of the at least one label at an edge computing device of the package management system and sending, by the package management system, the at least one image frame of the at least one label to the cloud platform for initiating a manual intervention.

In an embodiment, the information associated with the at least one package comprises at least one of barcodes, text and contextual information associated with the at least one package, instructions for handling the at least one package and hazard warning associated with the at least one package.

In an embodiment, the tracking details associated with the at least one package comprises at least one of a timestamp associated with a movement of the at least one package and a location information associated with the at least one package.

Accordingly, the embodiments herein provide for a package management system for package movement visibility in warehouse operations. The package management system includes a set of sensor fusion configured to identify at least one object entering an area of effect (AOE) and moving in a predetermined direction. The package management system also includes at least one image sensor configured to record at least one image frame of the at least one object and an edge computing device configured to determine that the at least one object in the at least one image frame is at least one package and determine at least one label on the at least one package from the at least one image frame. The package management system includes a cloud platform configured to determine a match to the at least one label in a cloud platform and send tracking details associated with the at least one package based on the match to the at least one label in the cloud platform, to a client device in real-time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which:

FIG. 3A is a block diagram illustrating various modules installed locally at the warehouse for the package movement visibility, according to the embodiments as disclosed herein;

DETAILED DESCRIPTION OF EMBODIMENT

Figure 1:
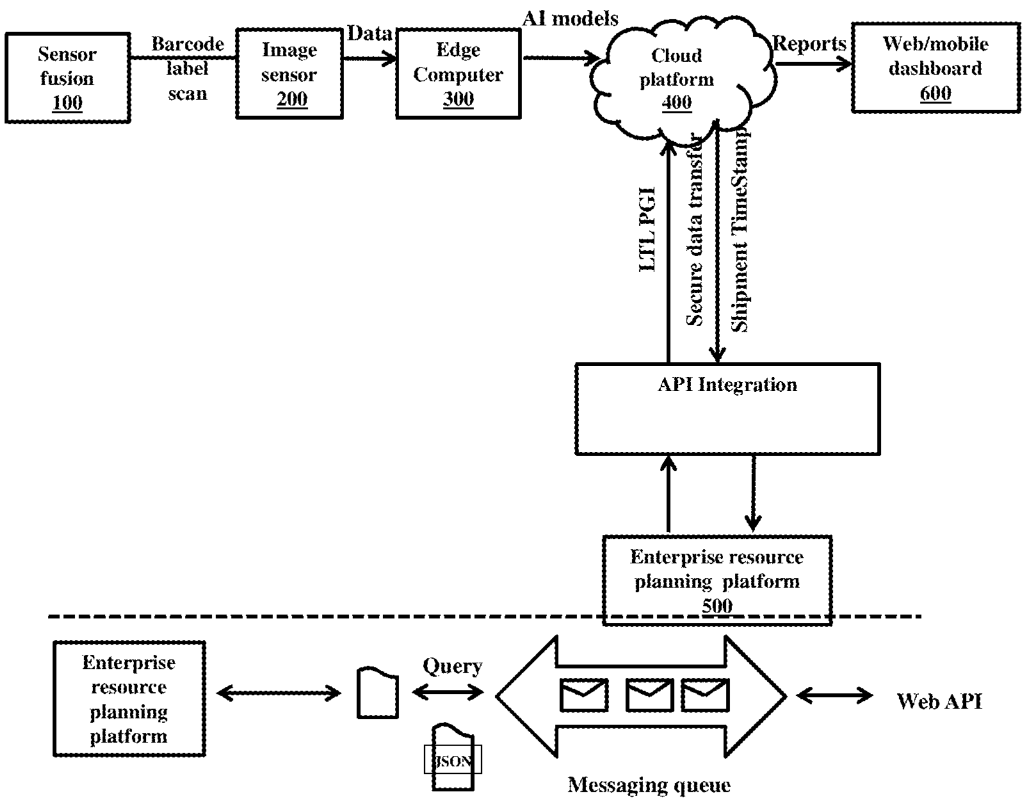
FIG. 1 illustrates a package management system for package movement visibility in warehouse operations, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The present disclosure provides a method for package movement visibility in warehouse operations by a package management system. The method includes identifying, by the package management system, at least one object entering an area of effect (AOE) and a moving in a predetermined direction and recording, by the package management system, at least one image frame of the at least one object. The method also includes determining, by the package management system, that the at least one object in the at least one image frame is at least one package and determining, by the package management system, at least one label on the at least one package from the at least one image frame. The method determining, by the package management system, a match to the at least one label in a cloud platform; and sending, by the package management system, tracking details associated with the at least one package based on the match to the at least one label in the cloud platform, to a client device in real-time.

Accordingly, the embodiments herein provide for a package management system for package movement visibility in warehouse operations. The package management system includes a set of sensor fusion configured to identify at least one object entering an area of effect (AOE) and moving in a predetermined direction. The package management system also includes at least one image sensor configured to record at least one image frame of the at least one object and an edge computing device configured to determine that the at least one object in the at least one image frame is at least one package and determine at least one label on the at least one package from the at least one image frame. The package management system includes a cloud platform configured to determine a match to the at least one label in a cloud platform and send tracking details associated with the at least one package based on the match to the at least one label in the cloud platform, to a client device in real-time.

Unlike the conventional methods and system, the proposed method uses artificial intelligence (AI) to detect objects approaching the system based on sensor fusion and only then triggers the image sensor to capture the image of the package. Further, the proposed method detects the package package based on images captured by the image sensor. Only when the package package is detected, the images are further processed. As a result, the unnecessary capture of images of objects other than the package package is avoided which increases processing capacity of the system.

In the conventional methods and systems, the image sensor or the image processing system is not connected to the cloud platform. As a result, the customer may not be able to track the package package in real-time. Unlike the conventional methods and system, in the proposed method the image sensor or the image processing system is not connected to the cloud platform which is in turn connected to the ERP system of the client. Therefore, the customer can track the package package in real-time based on the timestamp, location etc. associated with the package.

In conventional methods and systems, the image sensor needs to be placed close to the package or on a conveyor belt to be able to capture and scan the barcode. Hence, there is a requirement of a specific type of image sensor and also since the image sensor is located close to the package the wear-and-tear will also be high. Unlike the conventional methods and system, the proposed method includes placing the image sensor at a height of 8 to 10 ft above the ground surface and yet being able to capture the image with the label and barcode efficiently. Also, the image sensors are able to scan the barcodes on the packages without exact placement of the barcode and guidance of the package. The proposed method on having tested in production settings provides barcode-retrieval accuracies of greater than 95%.

Unlike the conventional methods and system, the proposed method requires low computing power due to the use of CPU for executing the algorithm.

Referring now to the drawings, and more particularly to FIGS. 1 through 5, where similar reference characters denote corresponding features consistently throughout the figures, there are shown preferred embodiments.

FIG. 1 illustrates a package management system (1000) for package movement visibility in warehouse operations, according to the embodiments as disclosed herein.

Referring to the FIG. 1, the package management system (1000) is a fully automated system for tracking the package movement visibility in the warehouse. The package management system (1000) detects when a package moves towards a shipping bay door and scans information present on the package. The package can be for example but not limited to pallets, parcels, boxes, container, etc. Further, dimensions, shapes and sizes of the package is not a limitation to the scope of the invention. The package can be moved towards or away from the package management system (1000) via any of a human worker, a robot, a pallet jack, a fork lift, a conveyor belt etc. The mode of movement of the package is not limited by any embodiment of the proposed method or the package management system (1000).

The package management system (1000) includes multiple components which include but are not limited to, plurality of sensor fusion (100), Internet of things (IoT) devices such as image sensor (200), edge computing device (300) and cloud platform (400).

In an embodiment, a sensor fusion of the plurality of sensor fusions (100) is configured to determine when an object approaches a region of interest (ROI) or an area of effect (AOE) associated with the sensor fusion (100). Further, the sensor fusion also ascertains if a direction of approach of the object is of interest i.e., whether the object is moving towards or away from the ROI. In response to determining that the object is moving towards the ROI, the sensor fusion triggers the image sensor (200) to start capturing the image frames of the object.

The image sensor (200) is, for example, a camera, a video recorder, etc. On being ascertained by the sensor fusion (100) that the object is approaching towards the ROI, the image sensor (200) starts recording image frames of the object and determines whether the object captured in the image frames is a package. In response to determining that the object in the image is not a package, the image sensor (200) stops recording any further images/video of the object and resets. In response to determining that the object in the image is a package, the image frames are sent to the edge computing device (300) which processes the image frames of the package in a streaming fashion as the image frames become available. The edge computing device (300) processes the image frames of the package to determine whether a label is present on the package. On determining the presence of the label, the edge computing device (300) determines whether the label includes information such as for example but not limited to barcode, contextual information such as "handle with care", "hazardous material, etc. Further, on determining the information on the label, an information extractor reads the barcodes.

The information is then sent to the cloud platform (400). At the cloud platform (400) the information is matched with the customer's enterprise resource planning (ERP) system (500) in order to convey information related to the package such as location of dispatch, time of dispatch, etc. from the warehouse. The information related to the package is then sent in real-time to a customer device and can be accessed through web or mobile dashboard (600).

In case the edge computing device (300) determines that the label on the package does not have an information/barcode or the information/barcode detected on the label does not have a match in the cloud platform (400), then the details related to such packages are also stored in the cloud platform (400) and may be deleted after a specific interval of time.

The package management system (1000) can be installed at manufacturing facilities or goods producing companies which need to be held accountable for on-time delivery of products to customers. The package management system (1000) is applicable not only during a loading or un-loading of shipment trucks and can be used anywhere within the warehouse operations where reading the information on the labels may be critical for operational decisions and tracking of the packages. For example, in a chemical plant where multiple chemicals may have to be automatically mixed based on the labels on respective chemical containers.

The visibility into the outbound shipment pickup enables the manufacturer to:

Comply with delivery SLAs with customers.

Hold carriers accountable for shipment delays caused by delayed pickup.

Provide better visibility to customers in the entire shipment process.

- Automatically keeping track of the packages transported by a large warehouse with multiple shipping bays is a task that would be cumbersome or impossible to handle with one or even two humans. The same can be automated using the package management system (1000) to make the shipping more efficient.
- The entire system can be operated in offline mode. The barcode data can be processed and stored at the edge computing device (300) locally and wait for network availability. Once the network is available and the package management system (1000) is online, the data stored at the edge computing device (300) locally can be fed to the cloud platform (400). Hence the package management system (1000) is immune from major network related blackouts.
- Operate in low power consumption mode and with high processing speed. Hence the package management system (1000) and the method are cost effective and economic to be installed in large warehouses.
- Easily incorporated in fully automated warehouses. The package management system (1000) can interact with robots in fully automated warehouses for tracking and management of packages.

Figure 2:
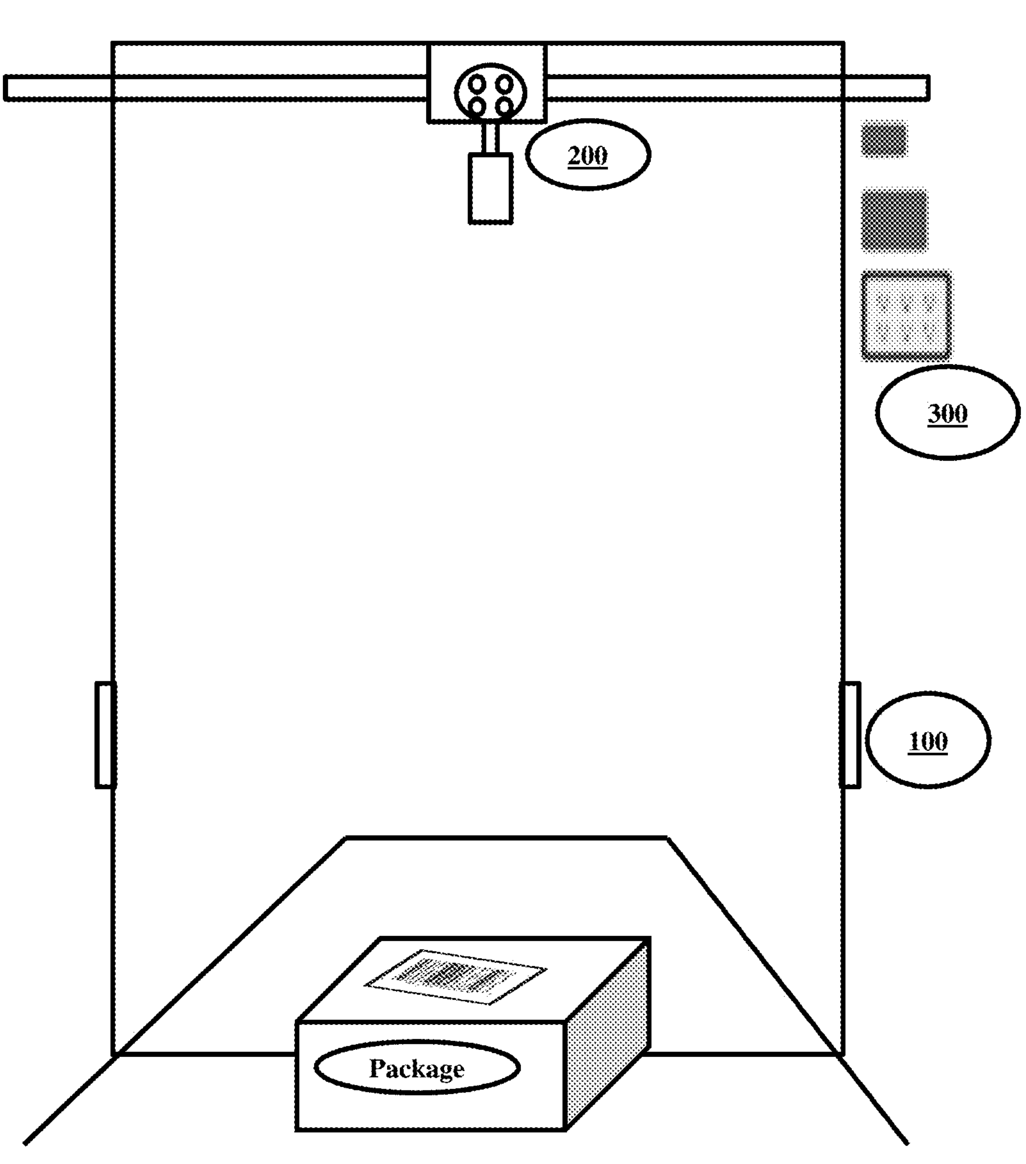
FIG. 2 is a schematic diagram illustrating hardware components of the system installed at a package loading location in a warehouse for the package movement visibility, according to the embodiments as disclosed herein.

FIG. 2 is a schematic diagram illustrating hardware components of the package management system (1000) installed at the package loading location in the warehouse for the package movement visibility, according to the embodiments as disclosed herein.

Referring to the FIG. 2, the hardware components installed at each of the ROI where the warehouse wants to scan for example but not limited to an out-coming package. Though the example illustrates the hardware components installed to scan the out-coming package, the same is applicable in various scenarios and is not restricted to the same. The hardware components installed at each of the ROI includes a set of two sensor fusion (100), an image sensor (200) and the edge computing device (300). The sensor fusions (100) are directional to determine the movement of the package in a specific direction. The sensor fusions (100) are used to know if the package is leaving or arriving with respect to the package management system (1000). In the current implementation this is resolved by using two sensor fusions (100) placed at different locations. The sensor fusion (100) for example may include a multitude of sensors in combination, including IR light curtain, 2D or 3D lidars.

The image sensor (200) is for example a 4 k resolution image sensor which is pointed towards the area of effect (AOE) and is parallel to the ROI where the package will be placed. The image sensor (200) also contains an auto zoom option that can be programmatically triggered such that the packages of different heights can be accommodated. The image sensor (200) can be placed for example but not limited facing downwards at 8 to 10 ft height above the ground surface and yet can capture the image with the label and barcode efficiently. The image sensor (200) may be placed at an appropriate position to capture the image of the package with the label and barcode efficiently and is not restricted in its placement.

The edge computing device (300) is capable of processing the images of the package captured by the image sensor (200). No graphical processing unit (GPU) is needed and hence the cost of establishment is low compared to the existing mechanisms. In another example, the edge computing device (300) could be a smaller computing device at each scanning site, and a larger centralized computing device that performs more advanced computations. The edge computing device (300) includes a KNN classifier. The KNN classifier can be created on a standard python tool called scikit-learn. The KNN classifier can be trained on general processors (example, CPU or Central Processing Unit) as these models do not require a high degree of matrix computation, thereby negating the requirement for specialized processors such as GPU (Graphical Processing Unit). The KNN classifier is used to minimize false negatives during the identification of the package by the edge computing device (300) during processing of the captured images.

Though the package management system (1000) is explained with respect to the outbound shipment, the package management system (1000) is applicable for inbound packages as well. The inbound system enables automated receiving verification, receiving to inventory, and guides the customer/warehouse associate how to handle different incoming packages/packages (for example hazardous or handle with care). Inbound receiving and put-to-inventory actions are equally labor intensive and expensive as the outbound shipment management.

FIG. 3A is a block diagram illustrating various modules installed locally at the warehouse for the package movement visibility, according to the embodiments as disclosed herein.

Referring to the FIG. 3A, the various modules installed locally at the warehouse includes the sensor fusion (100), the image sensor (200) and the edge computing device (300).

The sensor fusion (100) is configured to determine the approaching packages. An alternative to the sensor fusion (100) is installation of a dedicated directional motion sensor. The sensor fusion (100) on determining that the object is in proximity, within the AOE and in the right direction of movement trigger the image sensor (200) to start recording/capturing images of the object in proximity. The sensor fusion (100) also sends a stop recording signal to the image sensor capture on a time based delay tweaked to the particular use case where the invention is deployed.

The edge computing device (300) includes a package identifier (320), a label detector (340) and an information extractor (360). The detection of the package by the package identifier (320) is done using a computer vision model trained using previously seen instances of images collected using the package management system (1000) containing packages or no packages. Once the process is certain this is a package, images will be sent through to the label detector (340).

The label detector (340) is configured to process the images containing packages to find labels on them. This is done using a combination of segmentation methods that segment the label from the images captured by the image sensor (200). First the label detector (340) pre-processes the images after which a contour detection algorithm is used by the label detector (340) to find the label ROI.

The label is detected by thresholding the images captured by the image sensor (200). The logic for thresholding involves empirically obtaining a range for thresholding values such that the label can always be obtained within the thresholding range. Further, the label detector (340) performs thresholding of the images comprising the labels at various values until contours of the expected size and shape are obtained. If no contours within given constraints are obtained for a given thresholding value, then the label detector (340) analyzes the next image. Further, the label detector (340) uses two types of ensembling technique depending on the level of permissivity controlled by environment variables. Non-max suppression (object detection ensembling algorithm) is used when the number of contours needs to be restricted (it behaves like an AND gate depending on its set threshold) and an OR-gate ensembling is used for highly permissive applications. The contours are restricted by applying a sizing mechanism. An expected minimum and maximum size for labels is fed to the edge computing device which is used to restrict the number of contours at a basic level. Combined with perimeter approximation algorithms, only the contours that can fall within the expected minimum and maximum sizes for labels are determined. The label detection is followed by the elimination of the duplicates. A non-max suppression is used to eliminate duplicates and minimize the number of contours further. The OR gate is used to be permissive and return all the contours selected by both of the contour selection algorithms. All labels found in an image are sent through to the information detection module for further processing.

The information extractor (360) processes each label image to determine multiple barcodes, extract text using OCR, and other contextual information such as “handle with care”, “hazardous material”, etc in the label. The barcode detection and reading can be performed using any existing method known in art. The information extractor (360) will first detect the barcode, and subsequently read the barcode. On top of the barcode detection algorithm, an OCR algorithm is run in ensemble with the standard barcode algorithms to increase robustness of the method. Similarly, the information extractor (360) extracts various other information from the label.

Figure 3B:
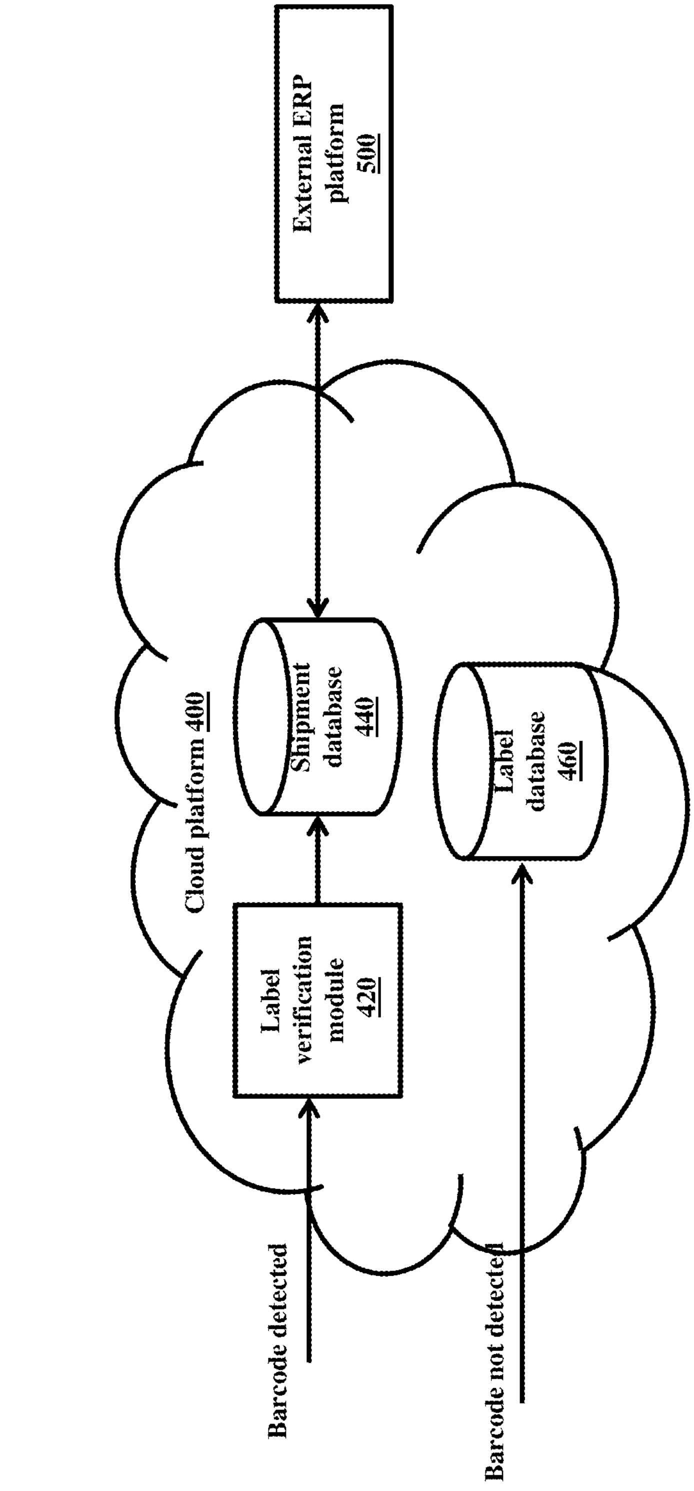
FIG. 3B is a block diagram illustrating various modules installed in a cloud system of the warehouse for the package movement visibility, according to the embodiments as disclosed herein.

FIG. 3B is a block diagram illustrating various modules installed in the cloud system (400) of the warehouse for the package movement visibility, according to the embodiments as disclosed herein.

Referring to the FIG. 3B, the cloud platform (400) comprises a label identification module (420), a running shipment database (440) mirroring an operational ERP system (500) and a label database (460). The shipment database (440) comprises LTL package information. When the information extractor (360) determines that the label includes the barcode, the information extractor (360) sends the information to the cloud platform (400) for verification. The label identification module (420) verifies the scanned with the information which is stored in the shipment database (440). A matching algorithm is used to match the scanned barcodes, the extracted text and the other contextual information from the label with the information, in the shipment database (440). Barcodes that are scanned are first grouped per batch, subsequently they are matched with the information obtained from the operational ERP system (500) and also duplicates are removed. Further, once a match is found for the scanned barcode, the scanned information is validated along with timestamp of inbound and outbound and location information is sent to the operational ERP system (500) of the customer. Further, a warehouse floor associate or carrier actions can also be trigger based on the information gathered.

Figure 4:
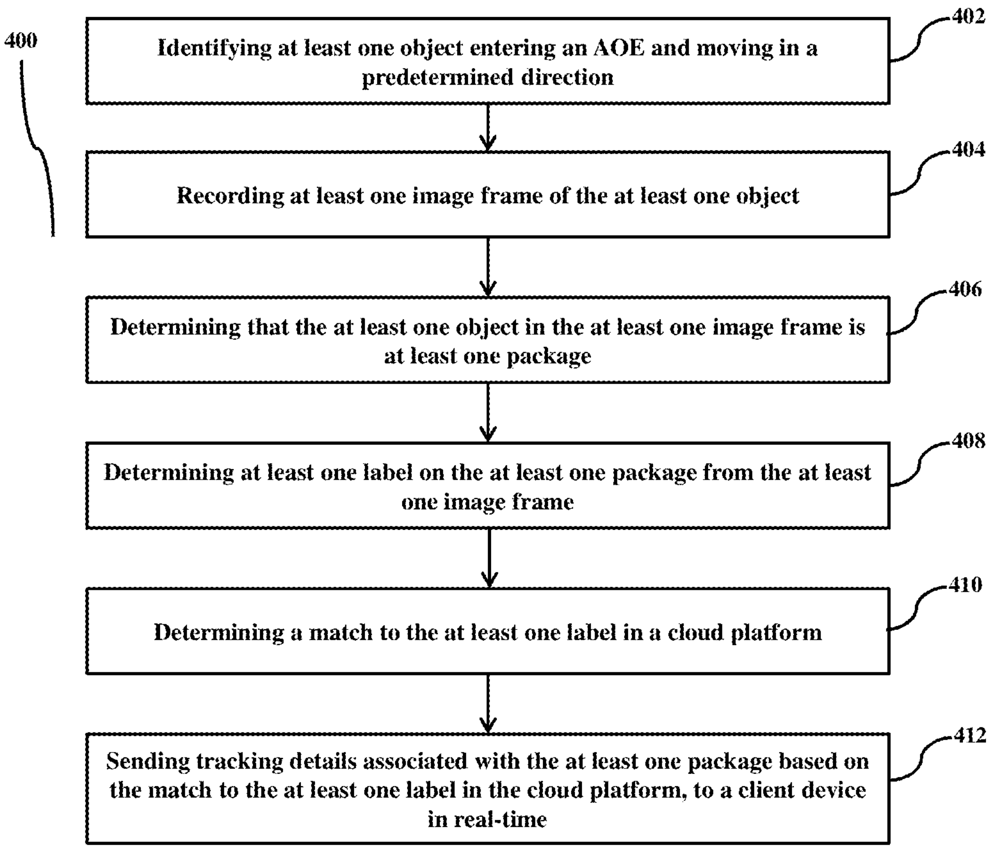
FIG. 4 is a flow chart illustrating a method for the package movement visibility in the warehouse operations by the package management system, according to the embodiments as disclosed herein.

FIG. 4 is a flow chart illustrating a method for the package movement visibility in the warehouse operations by the package management system (1000), according to the embodiments as disclosed herein.

Referring to the FIG. 4, at step 402, the method includes the package management system (1000) identifying the at least one object entering the AOE and moving in the predetermined direction.

At step 404, the method includes the package management system (1000) recording the at least one image frame of the at least one object.

At step 406, the method includes the package management system (1000) determining that the at least one object in the at least one image frame is the at least one package.

At step 408, the method includes the package management system (1000) determining the at least one label on the at least one package from the at least one image frame.

At step 410, the method includes the package management system (1000) determining the match to the at least one label in the cloud platform (400).

At step 412, the method includes the package management system (1000) sending the tracking details associated with the at least one package based on the match to the at least one label in the cloud platform, to the client device in real-time.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 5:
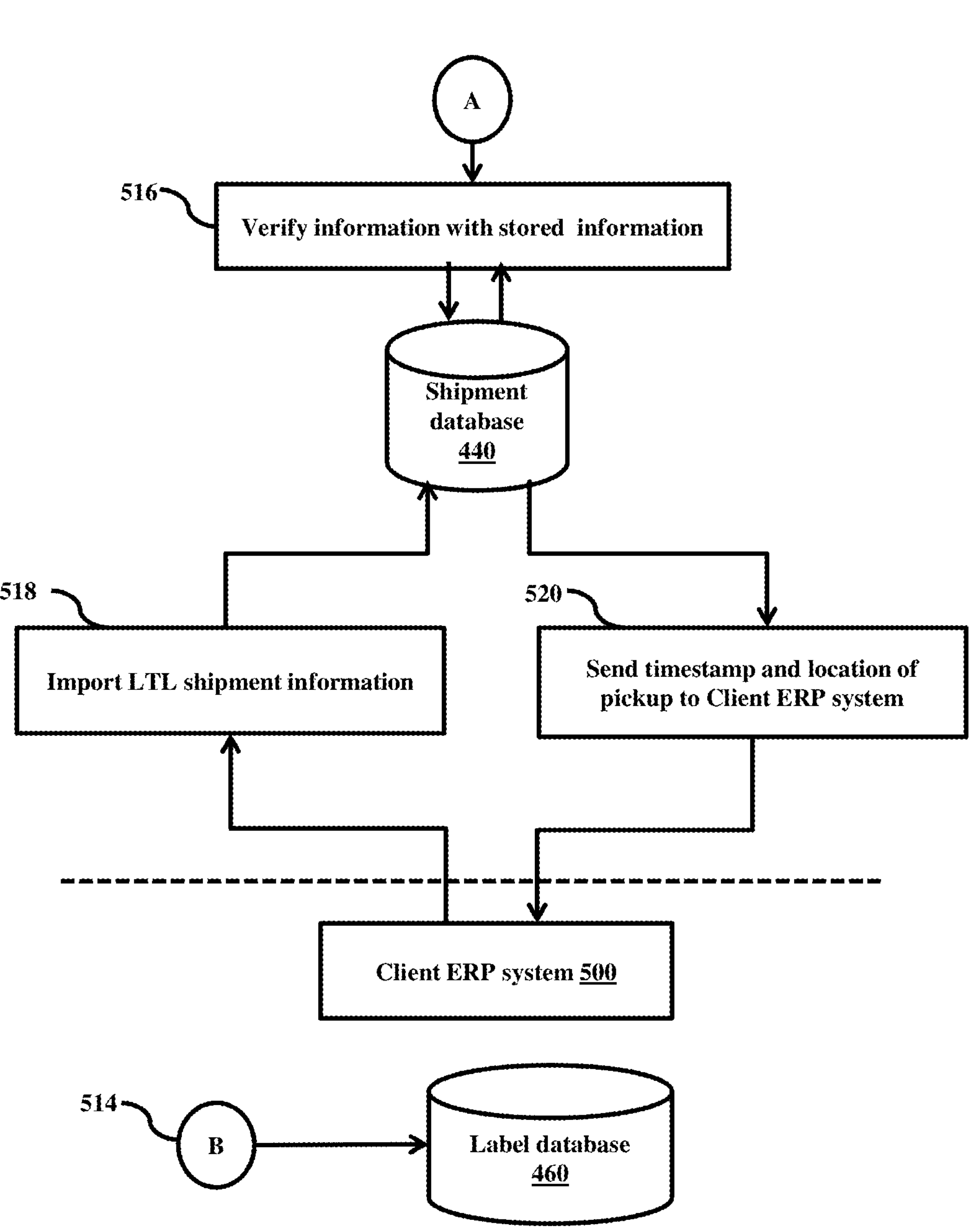
FIG. 5 is a flow chart illustrating a step-by-step procedure for the package movement visibility in the warehouse operations, according to the embodiments as disclosed herein.
Figure 5:
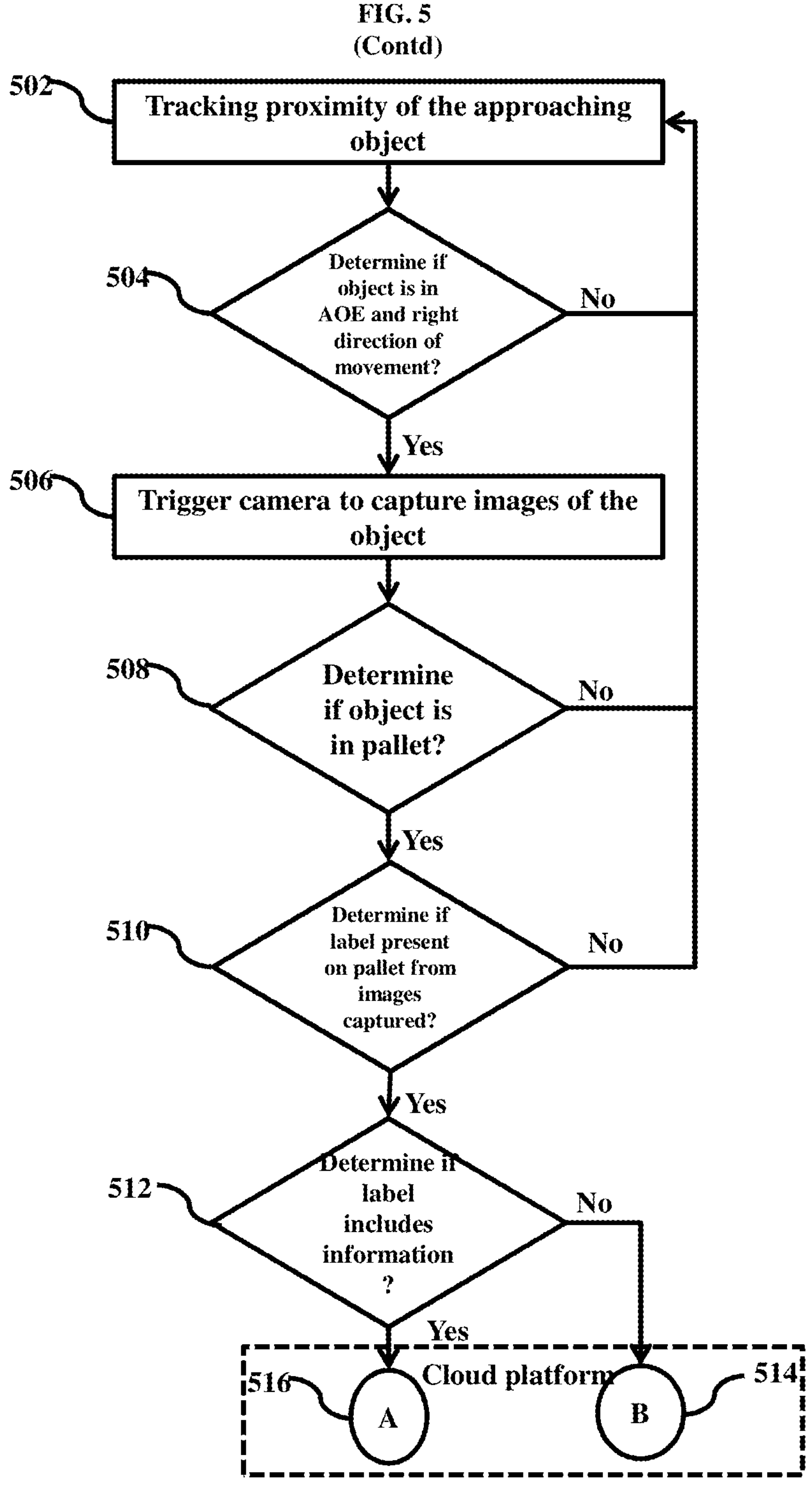

FIG. 5 is a flow chart illustrating a step-by-step procedure for the package movement visibility in the warehouse operations package, according to the embodiments as disclosed herein.

Referring to the FIG. 5, the step-by-step process of the package movement visibility in the warehouse operations is provided.

At step 502, the method includes tracking of the proximity of the objects which are approaching the package management system (1000) in the warehouse environment. At step 504, the method includes determining whether the object is within the AOE and in the right direction of movement. At step 506, the method includes triggering the image sensor to capture the image of the object, in response to determining that the object is within the AOE and in the right direction of movement.

At step 508, the method includes determining whether the object in the images captured by the image sensor is the package.

At step 510, the method includes determining the label on the package from the images captured, using the label detector.

At step 512, the method includes determining whether the label includes the information or not. If no information is detected, then the label images are saved and sent to the cloud platform (400), for potential manual intervention, as done in step 514.

At step 516, in response to determining the label includes the information, the method includes verifying the scanned information with the information in the shipment database (440). At step 520, once a match is found, then the timestamp and the location information is sent back to the operational ERP system (500).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for package movement visibility in warehouse operations by a package management system (1000), wherein the method comprises:

identifying, by the package management system (1000), at least one object entering an area of effect (AOE) and a moving in a predetermined direction, wherein the package management system (1000) determines when the at least one object approaches a region of interest (ROI) or the AOE, ascertains whether the at least one object is moving towards or away from the ROI, and, in response to determining that the at least one object is moving towards the ROI, triggers an image sensor (200) to start capturing the at least one image frame of the at least one object;

recording, by the package management system (1000), at least one image frame of the at least one object;

determining, by the package management system (1000), whether the at least one object in the at least one image frame is at least one package;

in response to determining that the at least one object in the at least one image frame is the at least one package, processing, by the package management system (1000), the at least one image frame of the at least one package in a streaming fashion as the at least one image frame becomes available;

determining, by the package management system (1000), at least one label on the at least one package from the at least one image frame;

determining, by the package management system (1000), whether the at least one label includes information associated with the at least one package;

extracting, by the package management system (1000), the information associated with the at least one package from the at least one label, in response to determining that the at least one label includes the information associated with the at least one package;

sending, by the package management system (1000), the extracted information associated with the at least one package to the cloud platform (400);

determining, by the package management system (1000), a match to the extracted information associated with the at least one package in the cloud platform (400) by verifying the extracted information with information stored in a shipment database (440) mirroring an operational enterprise resource planning system (500); and sending, by the package management system (1000), tracking details associated with the at least one package based on the match, to a client device in real-time.

2. The method as claimed in claim 1, wherein identifying, by the package management system (1000), the at least one object entering the AOE and moving in the predetermined direction comprises:

determining, by the package management system (1000), the at least one object approaching the package management system (1000);

determining, by the package management system (1000), a proximity of the at least one object approaching the package management system (1000);

determining, by the package management system (1000), that the proximity of the at least one object approaching the package management system (1000) meets a proximity threshold; and identifying, by the package management system (1000), the at least one object is in the AOE and moving in the predetermined direction based on the proximity threshold, wherein the package management system (1000) uses a set of two sensor fusions (100) placed at different locations and directional to determine movement of the package in a specific direction and to determine whether the package is leaving or arriving with respect to the package management system (1000), the sensor fusion (100) including a multitude of sensors in combination, including IR light curtain, 2D or 3D lidars, and wherein the image sensor (200) is a 4 k resolution image sensor pointed towards the AOE and parallel to the ROI, includes an auto zoom option that is programmatically triggered such that packages of different heights are accommodated, and is placed facing downwards at 8 to 10 ft height above the ground surface.

3. The method as claimed in claim 1, wherein determining, by the package management system (1000), that the at least one object in the at least one image frame is at least one package comprises:

processing, by the package management system (1000), the at least one image frame using a KNN classifier created on a standard python tool called scikit-learn and trained on general processors including a CPU, such that no graphical processing unit (GPU) is needed and false negatives during identification of the package are minimized; and determining, by the package management system (1000), that the at least one object in the captured at least one image frame is the at least one package.

4. The method as claimed in claim 3, further comprising:

determining, by the package management system (1000), that the at least one object in the captured at least one image frame is not the at least one package; and stopping, by the package management system (1000), recording any further image/video of the at least one object and resetting the image sensor (200).

5. The method as claimed in claim 4, wherein the label detector (340), if no contours within given constraints are obtained for a given thresholding value, analyzes a next image, restricts contours by applying a sizing mechanism based on an expected minimum size and an expected maximum size for labels, uses perimeter approximation algorithms so that only contours that fall within the expected minimum size and the expected maximum size for labels are determined, uses non-max suppression when the number of contours needs to be restricted, uses OR-gate ensembling for highly permissive applications, and eliminates duplicates using non-max suppression.

6. The method as claimed in claim 1, wherein determining, by the package management system (1000), the match to the at least one label in the cloud platform (400) comprises:

pre-processing, by the package management system (1000), the at least one image frame and using a contour detection algorithm to find a label ROI;

detecting, by the package management system (1000), the at least one label by thresholding the at least one image frame at various values until contours of expected size and shape are obtained;

if no contours within given constraints are obtained for a given thresholding value, analyzing, by the package management system (1000), a next image and restricting the contours by applying a sizing mechanism based on an expected minimum and maximum size for labels, perimeter approximation algorithms, non-max suppression, and OR-gate ensembling;

determining, by the package management system (1000), whether the at least one label on the at least one package comprises information associated with the at least one package;

extracting, by the package management system (1000), the information associated with the at least one package from the at least one label, in response to determining that the at least one label on the at least one package comprises the information associated with the at least one package;

sending, by the package management system (1000), the extracted information associated with the at least one package from the at least one label to the cloud platform (400); and determining, by the package management system (1000), the match to the extracted information associated with the at least one package in the cloud platform (400) by verifying the extracted information with information stored in a shipment database (440) mirroring an operational enterprise resource planning system (500).

7. The method as claimed in claim 6, further comprising:

determining, by the package management system (1000), that the at least one label on the at least one package does not have information/barcode or that the information/barcode detected on the at least one label does not have a match in the cloud platform (400);

storing, by the package management system (1000), the at least one image frame of the at least one label at an edge computing device (300) of the package management system (1000) and storing details related to the at least one package in a label database (460) of the cloud platform (400); and sending, by the package management system (1000), the at least one image frame of the at least one label to the cloud platform (400) for initiating a potential manual intervention.

8. The method as claimed in claim 1, wherein the at least one label on the at least one package comprises at least one of barcodes, text, contextual information associated with the at least one package, instructions for handling the at least one package and hazard warning associated with the at least one package.

9. The method as claimed in claim 1, wherein the tracking details associated with the at least one package comprise at least one of a timestamp of inbound and outbound and location information associated with the at least one package, and wherein once the match is found the timestamp of inbound and outbound and the location information are sent to the operational enterprise resource planning system (500).

10. The method as claimed in claim 1, wherein the package management system (1000) operates in offline mode such that barcode data is processed and stored at the edge computing device (300) locally and, once network availability is restored and the package management system (1000) is online, the barcode data stored at the edge computing device (300) locally is fed to the cloud platform (400).

11. A package management system (1000) for package movement visibility in warehouse operations, wherein the package management system (1000) comprises:

a set of sensor fusion (100) configured to identify at least one object entering an area of effect (AOE) and moving in a predetermined direction by determining when the at least one object approaches a region of interest (ROI) or the AOE, ascertaining whether the at least one object is moving towards or away from the ROI, and, in response to determining that the at least one object is moving towards the ROI, triggering at least one image sensor (200) to start capturing at least one image frame of the at least one object;

at least one image sensor (200) configured to record at least one image frame of the at least one object;

an edge computing device (300) comprising a package identifier (320), a label detector (340), and an information extractor (360), the edge computing device (300) configured to determine whether the at least one object in the at least one image frame is at least one package, in response to a determination that the at least one object in the at least one image frame is the at least one package process the at least one image frame in a streaming fashion as the at least one image frame becomes available, determine at least one label on the at least one package from the at least one image frame, determine whether the at least one label includes information associated with the at least one package, extract the information associated with the at least one package from the at least one label, and send the extracted information associated with the at least one package to a cloud platform (400);

cloud a cloud platform (400) comprising a label identification module (420) and a shipment database (440) mirroring an operational enterprise resource planning system (500), wherein the cloud platform (400) configured to verify the extracted information with information stored in the shipment database (440), determine a match to the extracted information associated with the at least one package, and send tracking details associated with the at least one package based on the match to a client device in real-time.

12. The package management system (1000) as claimed in claim 11, wherein identifying the at least one object entering the AOE and moving in the predetermined direction by the set of sensor fusion (100) comprises:

determine the at least one object approaching the package management system (1000);

determine a proximity of the at least one object approaching the package management system (1000);

determine that the proximity of the at least one object approaching the package management system (1000) meets a proximity threshold; and identify the at least one object is in the AOE and moving in the predetermined direction based on the proximity threshold, wherein the package management system (1000) comprises a set of two sensor fusions (100) placed at different locations, the set of two sensor fusions (100) being directional to determine movement of the package in a specific direction and to determine whether the package is leaving or arriving with respect to the package management system (1000), the sensor fusion (100) including a multitude of sensors in combination, including IR light curtain, 2D or 3D lidars, and wherein the at least one image sensor (200) is a 4 k resolution image sensor pointed towards the AOE and parallel to the ROI, includes an auto zoom option that is programmatically triggered such that packages of different heights are accommodated, and is placed facing downwards at 8 to 10 ft height above the ground surface.

13. The package management system (1000) as claimed in claim 11, wherein determining that the at least one object in the at least one image frame is at least one package by the edge computing device (300) comprises:

process the at least one image frame using a KNN classifier created on a standard python tool called scikit-learn and trained on general processors including a CPU, such that no graphical processing unit (GPU) is needed and false negatives during identification of the package by the edge computing device (300) are minimized; and determine that the at least one object in the captured at least one image frame is the at least one package.

14. The package management system (1000) as claimed in claim 13, wherein the edge computing device (300) is further configured:

determine that the at least one object in the captured at least one image frame is not the at least one package; and stop recording any further image/video of the at least one object and reset the at least one image sensor (200).

15. The package management system (1000) as claimed in claim 14, wherein the label detector (340) is further configured, if no contours within given constraints are obtained for a given thresholding value, to analyze a next image, to restrict contours by applying a sizing mechanism based on an expected minimum size and an expected maximum size for labels, to use perimeter approximation algorithms so that only contours that fall within the expected minimum size and the expected maximum size for labels are determined, to use non-max suppression when the number of contours needs to be restricted, to use OR-gate ensembling for highly permissive applications, and to eliminate duplicates using non-max suppression.

16. The package management system (1000) as claimed in claim 11, wherein determining the match to the at least one label in the cloud platform (400) comprises:

pre-process the at least one image frame and use a contour detection algorithm by the label detector (340) to find a label ROI;

detect, by the label detector (340), the at least one label by thresholding the at least one image frame at various values until contours of expected size and shape are obtained;

if no contours within given constraints are obtained for a given thresholding value, analyze a next image and restrict the contours by applying a sizing mechanism based on an expected minimum and maximum size for labels, perimeter approximation algorithms, non-max suppression, and OR-gate ensembling;

determine by the edge computing device (300) whether the at least one label on the at least one package comprises information associated with the at least one package;

extract by the edge computing device (300) the information associated with the at least one package from the at least one label, in response to determining that the at least one label on the at least one package comprises the information associated with the at least one package;

send by the edge computing device (300) the extracted information associated with the at least one package from the at least one label to the cloud platform (400); and determine by the cloud platform (400) the match to the extracted information associated with the at least one package in the cloud platform (400) by verifying the extracted information with information stored in a shipment database (440) mirroring an operational enterprise resource planning system (500) and using a matching algorithm to match scanned barcodes, extracted text, and other contextual information from the label with the information in the shipment database (440).

17. The package management system (1000) as claimed in claim 16, wherein the edge computing device (300) is further configured to:

determine that the at least one label on the at least one package does not comprise the information associated with the at least one package or that the information/barcode detected on the at least one label does not have a match in the cloud platform (400);

store the at least one image frame of the at least one label and store details related to the at least one package in a label database (460) of the cloud platform (400); and send the at least one image frame of the at least one label to the cloud platform (400) for initiating potential manual intervention.

18. The package management system (1000) as claimed in claim 11, wherein the at least one label on the at least one package comprises at least one of barcodes, text, contextual information associated with the at least one package, instructions for handling the at least one package and hazard warning associated with the at least one package.

19. The package management system (1000) as claimed in claim 11, wherein the tracking details associated with the at least one package comprise at least one of a timestamp of inbound and outbound and location information associated with the at least one package, and wherein once the match is found the timestamp of inbound and outbound and the location information are sent to the operational enterprise resource planning system (500).

20. The package management system (1000) as claimed in claim 11, wherein the package management system (1000) is configured to operate in offline mode such that barcode data is processed and stored at the edge computing device (300) locally and, once network availability is restored and the package management system (1000) is online, the barcode data stored at the edge computing device (300) locally is fed to the cloud platform (400).

* * * * *